Sept. 12, 1939.   J. DE HEER   2,172,438
MOTION PICTURE CAMERA
Filed July 16, 1937   2 Sheets-Sheet 1
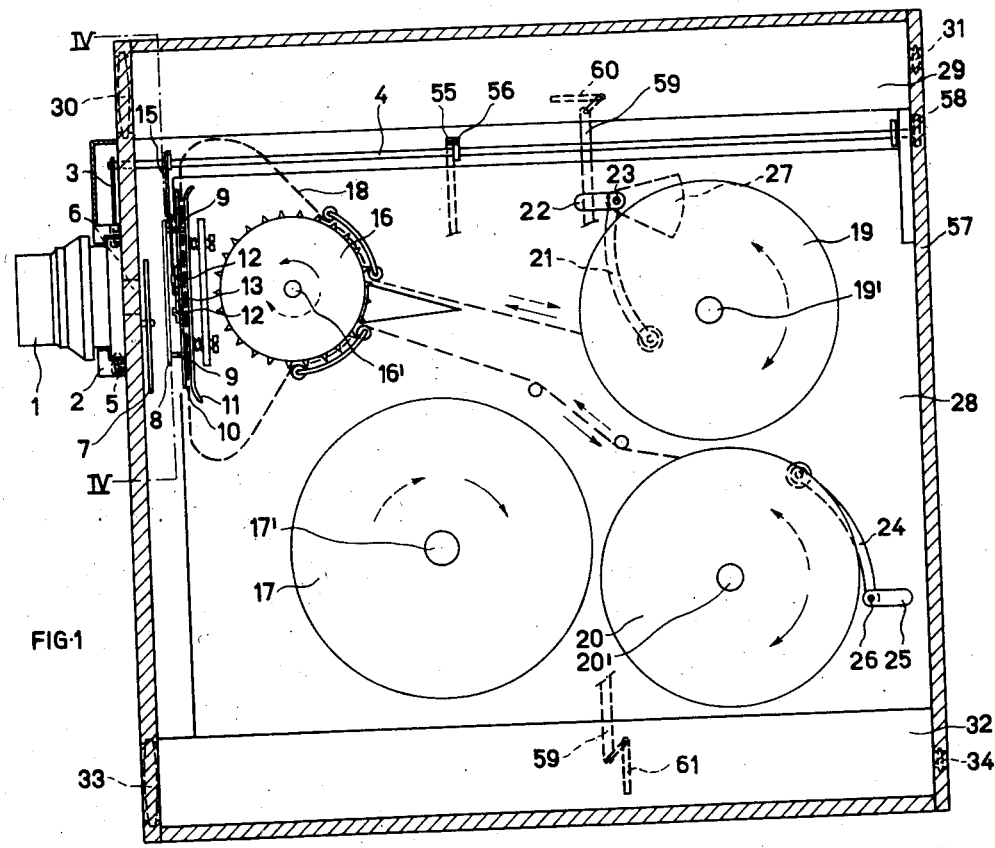
FIG·1
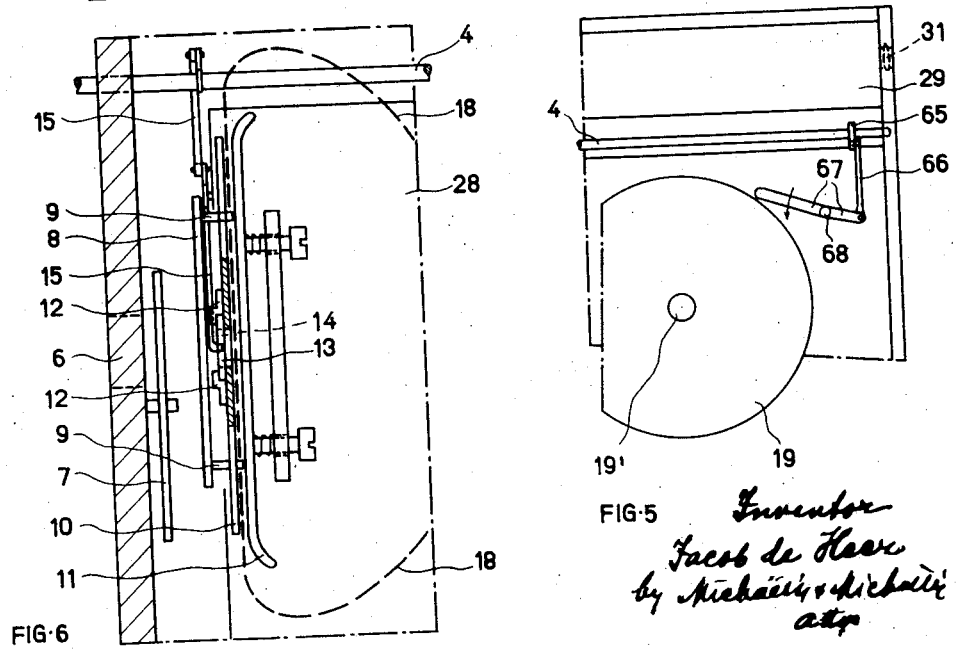
FIG·6
FIG·5
Inventor
Jacob de Heer
by Michaelis & Michaelis
attys Sept. 12, 1939.  J. DE HEER  2,172,438
MOTION PICTURE CAMERA
Filed July 16, 1937  2 Sheets-Sheet 2
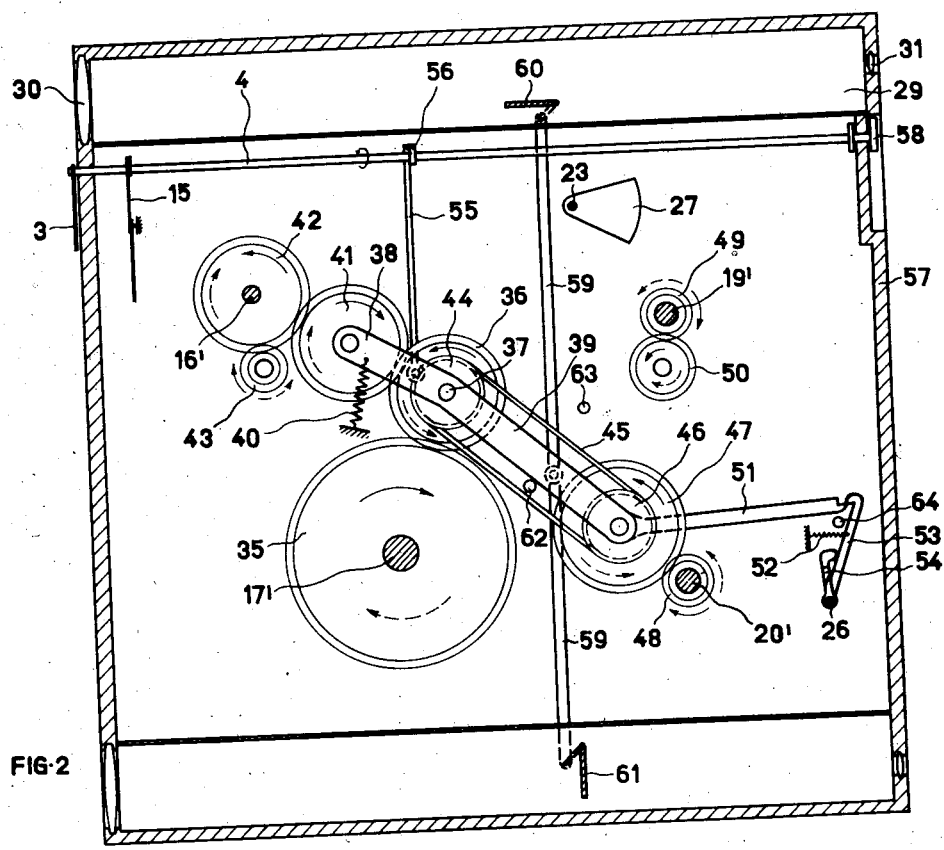
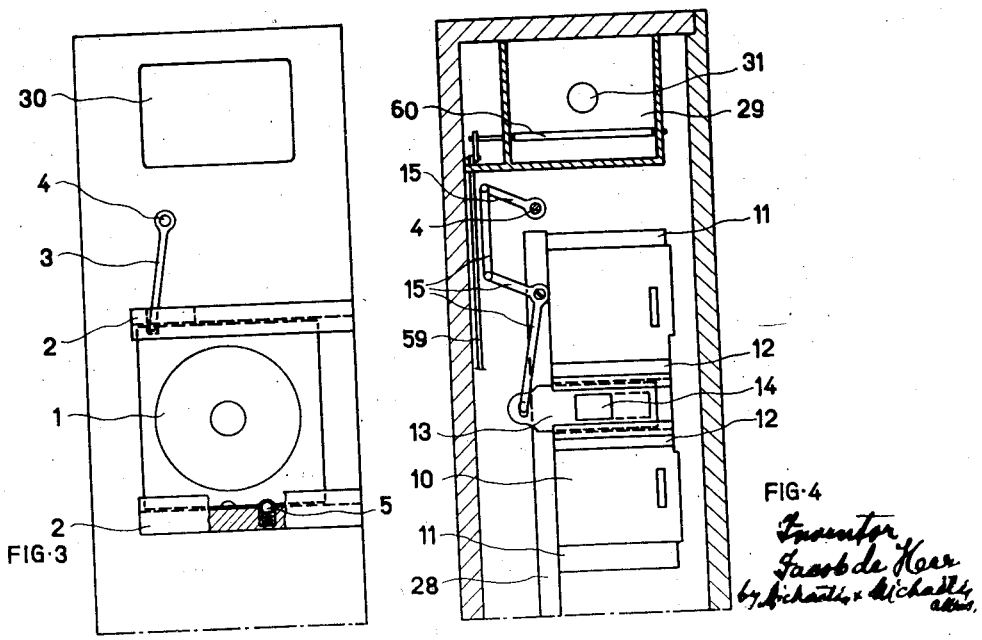

UNITED STATES PATENT OFFICE 2,172,438

MOTION PICTURE CAMERA

Jacob de Heer, Amsterdam, Netherlands

Application July 16, 1937, Serial No. 153,921

2 Claims. (Cl. 88—16)

My invention relates to cameras for use in connection with the taking and projecting of motion pictures, more especially on substandard film.

It is an object of my invention to provide means, whereby two rows of pictures juxtaposed on a film can be taken and projected by reversing the direction of travel of the film.

I am aware that film cameras have been suggested, in which, when the film passes from one spool to the other, only one half of the width of the film is exposed. After the whole of the film has travelled past the lens and is wound up altogether on the winding-up spool, the camera is opened, the two spools are exchanged and the film is passed once more past the lens, the second spool now functioning as the first spool and vice versa. In this operation the other half of the width of the film is exposed.

The steps of exchanging the spools etc. are rendered unnecessary if according to this invention the lens is made adjustable relative to the camera and the spool revolving mechanism is made reversible. If in such a camera one half of the width of the film has been exposed, the lens is merely shifted transversely to the film so as to be located in front of the other half of the film. On the spools being now revolved in the opposite direction and the camera turned upside down, the other half of the width of the film is exposed.

In the drawings affixed to this specification and forming part thereof a film camera embodying my invention is illustrated diagrammatically by way of example.

In the drawings—

Fig. 1 is a side elevation partly in vertical section of the camera with one side wall removed.

Fig. 2 is a similar view of the mechanism separated by a partition from the film spools etc.

Fig. 3 is a front elevation of the top part of the front wall of the camera showing the means for displacing the lens, partly in section.

Fig. 4 is a cross section on the line IV—IV in Fig. 1.

Fig. 5 illustrates a detail.

Fig. 6 shows the picture frame and adjoining parts on a larger scale, the front wall being shown in section.

Referring to the drawings, 1 is the lens and 2 are horizontal guides for the lens board, which can be shifted laterally, being actuated for this purpose by an arm 3 mounted on a spindle 4 extending across the camera. 5 is a spring catch located in the lower guide 2 and serving to arrest the lens board in one or the other position. 6 is the light aperture, 7 is the revolving shutter or Maltese cross movement, 8 is the reciprocatory film gripping member, the pins 9 of which, extending through slots in the pressure plate 10, project into the sprocket perforations of the film. 11 is the resiliently mounted film guide. Above and below the light aperture in the pressure plate 10 are provided two guides 12, between which slides a shutter 13 formed with an aperture 14 and connected by means of a double-armed lever mechanism 15 with the spindle 4.

To the rear of the pressure plate the sprocket 16 is mounted on the axle 16', being driven by the coil spring-actuated wheel 17 mounted on a shaft 17'. The sprocket 16 leads the film from and to the spools 19 and 20 and past the pressure plates 10, 11. The spool 19 is provided with a recording lever 21 and crank 22 mounted for rotation on the spring-controlled axle 23.

A similar lever 24 with crank 25 and axle 26 is provided for cooperation with the spool 20.

Fig. 1 illustrates the position of the parts, in which the spool 19 still carries part of the film, the greater part of which is already wound on the spool 20. The scale 27 fixed to the axle 23 of lever 21 renders the progress of unwinding of the film from the spool 19 visible.

A partition 28 separates these parts from the transmission mechanism. In a top compartment 29 are arranged the finder lenses 30 and 31 for use in one position, and in the bottom compartment 32 the finder lenses 33 and 34 for use in the inverse position of the camera.

The mechanism illustrated in Fig. 2 is driven by a sprocket 35 mounted on the axle 17' of the coil spring. This sprocket 35 rotates always in the same direction as indicated by the two arrows. It meshes permanently with a sprocket 36 on an axle 37, about which turns a double-armed lever 38, 39, the arm 38 of which is pulled downwardly by a spring 40 and carries a toothed wheel 41, which meshes with a toothed wheel 42 which is mounted on the axis 16' of the film conveyer sprocket 16 and permanently meshes with another toothed wheel 43.

On the axle 37 is further mounted a sheave 44 which is coupled by an elastic cord 45 with a sheave 46 mounted for rotation at the free end of the lever arm 39 and is coupled with a toothed wheel 47. In the position shown in the drawing this wheel meshes with a toothed wheel 48 mounted on the axle 20' of spool 20. On the axle 19' of spool 19 is mounted a toothed wheel 49, which permanently meshes with a toothed wheel 50.

At the end of the lever arm 39 is further mounted a lever 51, the recessed end of which supports a hook 53 acted upon by a spring 52. A hook-shaped lever 54 fixed to the axle 26 exerts pressure on the hook 53.

To arm 38 is further connected a rod 55 which is linked to a lever 56 mounted on the spindle 4. On the rear end of this spindle is fixed a crank 58 serving to turn the spindle one way or the other.

To the arm 39 is further pivoted a rod 59, the top end of which is linked to a flap 60 mounted for rocking motion in the top compartment 29. The bottom end of rod 59 is linked to a similar flap 61 mounted for rocking motion in the bottom compartment 32. The flap 61 extends at right angles to the flap 60.

When the camera is used for an exposure in the position shown in the drawings, the parts will all be driven by the spring 17 in the directions indicated by the arrows drawn in full lines.

The compartment 29 is unobstructed by the flap 60, and the finder lenses 30, 31 are now free for use. The film is wound upon the spool 20 and in proportion as the winding up proceeds, the lever 24 is oscillated and the axle 26 rotated, whereby the lever 54 is caused to force the hook 53 towards the right, and when the film is wound up completely on spool 20, the hook 53 will release the arm 51, whereupon spring 40 will rock the double-armed lever 38, 39 in anticlockwise direction. In consequence of this movement—

1. Gear wheel 41 will roll in contact with wheel 36 and, before being released altogether by wheel 42, will engage wheel 43, whereby the film transport wheel 16 is braked. On wheel 41 having released wheel 42 and engaged wheel 43 exclusively, the direction of rotation of the transporting wheel 16 is reversed, while in view of the rapid changing over of wheel 41 from wheel 42 to wheel 43 the coil spring is prevented from unwinding rapidly.

2. The gear wheel 47, in being lifted by the arm 39, is disengaged from wheel 48, whereby the spool 20 is released, whereupon wheel 47 engages wheel 50 and drives the axle 19' of spool 19 in opposite direction, so that now this spool starts rewinding the film.

3. The lowering movement of arm 38 also causes the rod 55 to be lowered and the spindle 4, coupled with this rod, to be imparted an angular movement, whereby the lever 3 (Fig. 3) is caused to shift the lens 1, while the lever mechanism 15 at the same time shifts the shutter 13 to follow the movement on the lens.

4. The arm 39 in rising also lifts the rod 59, whereby the position of the shutters 60 and 61 is reversed, shutter 61 now uncovering the finder lenses in the bottom compartment.

The camera can now be operated further until the film is rewound altogether onto the spool 19, when both sides of the film have been exposed. After the spool carrying the film has been removed and a fresh film inserted, the crank 58 is operated to rock spindle 4 back into its original position. The rounded end of lever 51 forces the hook 53 aside, and the hook is then pulled back by spring 52 into engagement with the arm 51, the movement of the hook 53 being limited by the stop 64. The movements of the double-armed lever 38, 39 are limited by stops 62 and 63.

In order to prevent the camera from being used for exposure without the parts of the mechanism being previously returned into the correct position shown in the drawing, the device illustrated in Fig. 5 is provided, in which a crank 65 fixed on the spindle 4 is linked by means of a link 66 to a double-armed lever 67 pivoted on an axle 68. When the spindle 4 is rotated during the reversal of the film movement, the lever 67 is rocked in the direction of the arrow, until its free end projects in front of, and thereby locks, the spool 19 on its axle 19'. Therefore, after the spool 19 has been rotated for the winding up of the film, it can be removed from its axle 19' only after the locking lever 67 has been rocked back into its original position, whereby the spindle 4 is also rocked and thereby causes all the parts to return into their original position also.

I wish it to be understood that I do not desire to be limited to the exact details of construction shown and described for obvious modifications will occur to a person skilled in the art.

I claim:

1. A motion picture camera comprising in combination, a pair of spools, means for rotating said spools, a double-armed lever, a gear on one arm of said lever arranged to be alternately coupled with one and the other spool, a lens, means for shifting said lens transversely to the direction of travel of a film extending between said spools, a gear on the other end of said lever arranged for operative connection with said lens shifting means, means for transmitting motion from said spool rotating means to the gears on said lever, a permanently active means tending to turn said lever in one direction and means, influenced by the diameter of the roll of film on one of said spools, for temporarily holding one of said gears in operative engagement with that latter spool.

2. The camera of claim 1, in which a lever is coupled with the reversing gear, which is arranged to temporarily lock one of the spools when the film has been rewound thereon.

JACOB DE HEER.